Patented Feb. 4, 1941

2,230,631

UNITED STATES PATENT OFFICE 2,230,631

ALKALOIDAL NICOTINATES

Thomas K. Thomas, Woodhaven, and Edwin Dowzard, Brooklyn, N. Y., and Leo A. Flexser, Union City, N. J., assignors to The New York Quinine & Chemical Works, Inc., Brooklyn, N. Y., a corporation of New York No Drawing. Application August 5, 1939,
Serial No. 288,686

8 Claims. (Cl. 260—284)

This invention or discovery relates to alkaloidal nicotinates; and it comprises, as new materials of therapeutic value, nicotinates of the cinchona alkaloids, such as quinine, quinine nicotinate being a crystalline material containing about 72 per cent of quinine; it further comprises cinchona alkaloid nicotinates in medicinal preparations and dosages; and it still further comprises a method of making such preparations wherein nicotinic acid in aqueous solution is neutralized by an alcoholic solution of a cinchona alkaloid, such as quinine, and the new salt is recovered by evaporation and crystallization; all as more fully hereinafter set forth and as claimed.

Nicotinic acid, $C_5NH_4(COOH)$, is a pyridine carboxylic acid, the carboxyl being carried by a beta carbon of the pyridine ring, and it can be readily made by various synthetic methods. It appears to occur naturally in some form of combination in many vegetable and animal tissues, albeit in minute amount. Like the vitamins, it plays an ill-understood but important role in nutrition. It is often associated with the antineuritic vitamin B in foods. In the various complicated processes used in isolating that vitamin from rice polishings, nicotinic acid frequently appears as a by-product.

That nicotinic acid has therapeutic value is now well recognized, and it is often used in combating various deficiency diseases and particularly pellagra. It is as a rule administered as a free acid and the results are often irregular. The physiological actions appear to depend to a certain extent upon the conditions in the stomach; upon the acidity and the food materials temporarily present. There are sometimes disagreeable symptoms such as "hot flashes."

It has now been found that the action of nicotinic acid is more regular and controllable when it is administered as a salt of one of the cinchona alkaloids. Stomach conditions do not seem to be then controlling. The nicotinates give a predictable action; an action of a type often highly desirable in anemic cases of malnutrition.

Quinine and the various other cinchona alkaloids (cinchonidine, cinchonine, quinidine, hydroquinine, hydroquinidine and hydrocinchonidine) are generally administered as salts of strong acids; as sulfates or as hydrochlorides. Sulfates are most common. The anion in these salts has no therapeutic value; but there is the practical advantage that these salts, and particularly the sulfates, are readily crystallized and converted into preparations of high purity; of the extreme purity required in medicinal preparations.

The cinchona alkaloids are indicated, and administered as their salts, in a variety of maladies, not only malarial but in anemic conditions of various kinds. In these cases, in which malnutrition is a factor, the nicotinates of the cinchona alkaloids are valuable.

In spite of the presence of a basic pyridine group, nicotinic acid is a fairly strong acid; this being one reason for its disturbing influence in the stomach when administered in the free state. The acidity is strong enough to enable the production of neutral salts in stoichiometric proportions from the free bases using ordinary indicators such as litmus and methyl red. When the free base and the free acid, both in a pure condition, are admixed in stoichiometric proportions there is no by-product; the crystal crops obtained are pure and the mother liquor is not impure. Theoretically quinine and related cinchona alkaloids should combine with either one or two molecules of nicotinic acid to form mono- and dinicotinates. However, it is not convenient, as a practical matter, to prepare di-nicotinates of the crystalline definite character of the mono-nicotinates; of quinine and nicotinic acid combined in equimolecular proportions, for example.

In nicotinates containing nicotinic acid and cinchona alkaloids in stoichiometric proportion, the preparation is, in general, easily crystallized as a pure, stable and permanent salt not changing in storage. For pharmaceutical purposes the nicotinates are quite as definite as the sulfates and hydrochlorides, and the alkaloid is not accompanied by a therapeutically inactive anion as a sort of ballast.

In an excellent way of preparing quinine nicotinate, nicotinic acid is dissolved in water in the proportion of 3 parts to 75, both by weight. This solution is mixed with 9 parts of commercial quinine dissolved in about 20 parts of alcohol. The mixture is brought to a boil, filtered and the alcohol distilled out or evaporated. The residual aqueous solution is faintly acid to litmus. If need be, the aqueous solution prior to crystallization may be given a treatment with a good grade of decolorizing carbon. On evaporating down this solution to crystallization, the nicotinate is recovered as long rectangular needles. The dried crystal crop in general appearance resembles quinine sulfate. It contains no substantial amount of water of crystallization. Dried at 100° C. the melting point is 181° C. A quinine assay of one lot gave 72.08 per cent quinine calculated as the anhydrous base. Corrected for the 0.41 per cent moisture in this lot, the quinine content was 72.37 per cent. The theoretical percentage is 72.51 per cent.

Quinine mono-nicotinate is not particularly soluble in water at 25° C., about 1 gram dissolving in 100 cc. At 50° C. it is considerably more soluble. Quinine nicotinate is practically insoluble in acetone, benzol, ether and toluol. In chloroform and methyl and ethyl alcohol, it is quite soluble though but slightly soluble in isopropyl alcohol.

Corresponding nicotinates can be made by substituting the other cinchona alkaloids, cinchonidine, cinchonine, quinidine, hydroquinine, hydroquinidine and hydrocinchonidine, for the quinine in the above example; again using equimolecular proportions. The chemical properties of the products are generally similar.

In a practical embodiment of the present invention in making cinchonidine nicotinate, pure cinchonidine alkaloid was dissolved in boiling alcohol in the proportions of 8.8 grams of alkaloid and 75 cc. ordinary alcohol. A solution of pure nicotinic acid was made in the proportion of 3.7 grams acid to 50 cc. of hot water. The two liquids were mixed. The resulting solution was evaporated to 40 cc. On cooling, crystallization took place. The crystals were filtered off, washed with a small amount of water and dried at 100° C. Cinchonidine nicotinate was obtained in white, crystalline form in a yield of 10.5 grams, this material melting at 202–203° C. and containing, by assay, 70.9 per cent cinchonidine. The recovered material was slightly soluble in water. On evaporation of the filtrate to about 15 cc., a further crop of crystals of the same material was obtained.

In another embodiment, hydroquinine alkaloid was added to a solution of nicotinic acid in hot water, the proportions being 9.8 grams of hydroquinine to 3.8 grams of nicotinic acid in 60 cc. of water. The solution was kept hot until the alkaloid was completely dissolved, and the hot clear solution was treated with decolorizing carbon, filtered, and allowed to cool. Crystallization occurred and on filtering, washing and drying, white needle-like crystals of hydroquinine nicotinate were obtained. The hydroquinine nicotinate melted at 209° C. and assayed 75.8 per cent hydroquinine. The crystals were slightly soluble in water. On evaporation of the mother liquor, a second crop of crystals of the same composition was obtained.

In a further embodiment, nicotinic acid and dry, pure quinidine alkaloid were added to isopropyl alcohol in the proportions of 1.25 grams nicotinic acid and 3.2 grams of quinidine to 35 cc. of isopropyl alcohol. On warming the solids dissolved, but crystallization did not occur immediately upon cooling. The solvent was evaporated off and, after heating for one hour at 100° C., a clear glassy solid material was obtained which could be powdered when cool. This material was easily soluble in water. Similar results were obtained when using, in place of the isopropyl alcohol, other solvents including dioxane, benzol, carbon tetrachloride, acetone, ether, chloroform, ethyl alcohol, methyl alcohol and ethyl acetate.

In other embodiments of the invention, similar results were obtained with cinchonine, hydrocinchonidine and hydroquinidine nicotinates, which were prepared in the same way as the quinidine salt. In connection with the preparation of these compounds, it should be noted that while the salt in some instances was not obtained by crystallization from solution, definite compounds are nevertheless formed. This is shown by the fact that while the alkaloids and nicotinic acid are separately quite insoluble in many of the above solvents, the equimolecular union of the two is very soluble. A change in state accompanying the formation of the new compounds is thus clearly indicated.

In addition to the preparation of nicotinates of the cinchona alkaloids by wet processes involving the use of solvents, many of these nicotinates can also be prepared by fusing together stoichiometrical quantities of the constituents. In this fusion method, it is sometimes advantageous to recrystallize the product from a suitable solvent.

All of the mentioned cinchona alkaloids afford means for converting nicotinic acid into a dry, permanent, stable, standardized preparation. The nicotinates are particularly useful in deficiency diseases like pellagra, and are also considered useful in the treatment of deafness, trench mouth (Vincent's disease) and other ailments, and in relieving the unfavorable reactions of sulfanilamide.

The dry, stable mono-nicotinates described hereinabove may be administered as such, most conveniently in the form of capsules. The nicotinates are also made up into pills or capsules with milk sugar or other suitable excipient and may be administered in other forms. As previously indicated, the nicotinates of the cinchona alkaloids have distinctive properties; more than the sum of their constituents. Each of these nicotinates appears to have specific virtue in particular pathological conditions.

What is claimed is:

1. As a new composition having therapeutic value, a nicotinate of a cinchona alkaloid.
2. The composition of claim 1 in which the alkaloid is quinine.
3. The composition of claim 1 in which the alkaloid is cinchonidine.
4. The composition of claim 1 in which the alkaloid is hydroquinine.
5. As a new composition of matter useful in anemic disorders, the preparation of claim 1 in dosed form suitable for clinical administration.
6. The process of making a preparation having valuable therapeutic properties, which comprises reacting a cinchona alkaloid with an equimolecular amount of nicotinic acid and recovering the reaction product in the form of a stable, solid compound.
7. The process of making a preparation having valuable therapeutic properties which comprises exactly neutralizing a solution of a cinchona alkaloid with a solution of nicotinic acid, concentrating to crystallize, and recovering the crystals in pure form.
8. The process of claim 7 wherein the alkaloid is quinine in alcoholic solution and the nicotinic acid is in aqueous solution.

THOMAS K. THOMAS.
EDWIN DOWZARD.
LEO A. FLEXSER.